United States Patent
Yu et al.

(10) Patent No.: US 11,799,595 B2
(45) Date of Patent: Oct. 24, 2023

(54) PACKET RETRANSMISSION METHOD AND APPARATUS

(71) Applicant: Huawei Technologies Co., Ltd., Shenzhen (CN)

(72) Inventors: Jiahe Yu, Suzhou (CN); Lin Zhang, Suzhou (CN); Biao Ji, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 16/698,014

(22) Filed: Nov. 27, 2019

(65) Prior Publication Data

US 2020/0099482 A1 Mar. 26, 2020

Related U.S. Application Data

(63) Continuation of application No. PCT/CN2018/089116, filed on May 31, 2018.

(30) Foreign Application Priority Data

May 31, 2017 (CN) .......................... 201710402101.5

(51) Int. Cl.
| | | |
|---|---|---|
| *H04L 1/1829* | (2023.01) | |
| *H04L 1/1809* | (2023.01) | |
| *H04L 5/00* | (2006.01) | |
| *H04W 28/02* | (2009.01) | |
| *H04W 28/04* | (2009.01) | |
| *H04W 80/06* | (2009.01) | |
| *H04W 84/12* | (2009.01) | |

(52) U.S. Cl.
CPC .......... *H04L 1/1854* (2013.01); *H04L 1/1809* (2013.01); *H04L 5/0055* (2013.01); *H04W 28/0268* (2013.01); *H04W 28/04* (2013.01); *H04W 80/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,621,799 B1 * | 9/2003 | Kemp ................... | H04L 1/1809 370/282 |
| 2003/0098992 A1 * | 5/2003 | Park ..................... | H04L 1/1671 358/1.15 |
| 2003/0099221 A1 * | 5/2003 | Rhee ................. | H04W 52/0232 370/338 |

(Continued)

FOREIGN PATENT DOCUMENTS

| | | |
|---|---|---|
| CN | 101541038 A | 9/2009 |
| CN | 101651963 A | 2/2010 |

(Continued)

*Primary Examiner* — Adnan Baig
(74) *Attorney, Agent, or Firm* — Conley Rose, P.C.

(57) ABSTRACT

A packet retransmission method and apparatus includes, when a WLAN chip fails to send a packet, if a quantity of times for instructing, by a processor, the WLAN chip to send the packet is less than a limit quantity of times for a packet type of the packet, reinstructing, by the processor, the WLAN chip to send the packet, where the packet type is one of a plurality of packet types, and limit quantities of times for at least two of the plurality of packet types are different from each other.

20 Claims, 4 Drawing Sheets

(56) References Cited

U.S. PATENT DOCUMENTS

| | | | | |
|---|---|---|---|---|
| 2005/0117576 | A1* | 6/2005 | McDysan | H04L 47/2475 |
| | | | | 370/395.31 |
| 2007/0133586 | A1* | 6/2007 | Ojard | H04L 69/323 |
| | | | | 714/E11.207 |
| 2009/0086759 | A1* | 4/2009 | Heise | H04L 1/1887 |
| | | | | 370/474 |
| 2009/0168920 | A1 | 7/2009 | Chen | |
| 2016/0056927 | A1* | 2/2016 | Liu | H04N 19/107 |
| | | | | 370/216 |
| 2016/0365952 | A1 | 12/2016 | Kim et al. | |

FOREIGN PATENT DOCUMENTS

| | | | | |
|---|---|---|---|---|
| CN | 101682479 | A | 3/2010 | |
| CN | 102790719 | A | 11/2012 | |
| CN | 104104481 | A | 10/2014 | |
| EP | 1686716 | A1 | 8/2006 | |
| EP | 1906582 | A2 | 4/2008 | |
| WO | WO-2014182782 | A1 * | 11/2014 | ....... H04N 21/44209 |
| WO | 2016137593 | A1 | 9/2016 | |

* cited by examiner

PACKET RETRANSMISSION METHOD AND APPARATUS

CROSS-REFERENCE TO RELATED APPLICATIONS

This application is a continuation application of International Application No. PCT/CN2018/089116, filed on May 31, 2018, which claims priority to Chinese Patent Application No. 201710402101.5, filed on May 31, 2017. The disclosures of the aforementioned applications are hereby incorporated by reference in their entireties

TECHNICAL FIELD

This application relates to the communications field, and in particular, to a packet retransmission method and apparatus.

BACKGROUND

If an access point (AP) in a wireless local area network (WLAN) does not receive a returned acknowledgement (ACK) after sending a packet, the AP may retransmit the packet, to improve reliability.

After a quantity of times for trying to retransmit the packet reaches a limit, the AP stops trying to retransmit the packet. Consequently, a transmission success rate of the packet is affected.

SUMMARY

This application provides a packet retransmission method and apparatus, to increase a packet transmission success rate.

A first aspect of this application provides a packet retransmission method. In the method, when a WLAN chip fails to send a packet, a processor determines whether a quantity of times for instructing the WLAN chip to send the packet is less than a limit quantity of times for a packet type of the packet, and if the quantity of times for instructing the WLAN chip to send the packet is less than the limit quantity of times for the packet type of the packet, the processor reinstructs the WLAN chip to send the packet. The processor reinstructs the WLAN chip to send the packet. Therefore, a quantity of times for sending the packet is increased, and a packet transmission success rate is increased.

The packet type is one of a plurality of (at least two) packet types, and limit quantities of times for at least two of the plurality of packet types are different from each other. The packet type of the packet may be determined based on a type field of the packet. The limit quantity of times for the packet type of the packet may be preset by the processor based on the packet type, or may be configured by the processor based on the packet type of the packet in real time.

With reference to the first aspect, in an implementation of the first aspect, the method further includes discarding, by the processor, the packet if the quantity of times for instructing, by the processor, the WLAN chip to send the packet reaches the limit quantity of times for the packet type.

With reference to the first aspect or any implementation of the first aspect, in an implementation of the first aspect, that the processor reinstructs the WLAN chip to send the packet includes reinstructing, by the processor after wait duration, the WLAN chip to send the packet. A time interval for reinstructing the WLAN chip to send the packet is extended such that persistent burst noise that may occur is handled, and a packet sending success probability is further improved.

With reference to the first aspect or any implementation of the first aspect, in an implementation of the first aspect, the plurality of packet types include a voice packet and/or a video packet, and the plurality of packet types further include one or more of a User Datagram Protocol (UDP) packet, a Transmission Control Protocol (TCP) packet, and a management frame.

A limit quantity of times for the voice packet and/or the video packet is less than a limit quantity of times for at least one other packet type. A manner of setting the limit quantity of times for the voice packet and/or the video packet may be preset by the processor, or may be configured by the processor based on a packet type of the voice packet and/or the video packet in real time. If the voice packet and/or the video packet with a relatively high real-time requirement cannot be delivered in a timely manner, even though the voice packet and/or the video packet are/is finally sent successfully after being delayed for a relatively long time, a receive end may no longer need the voice packet and/or the video packet (because playing of a corresponding audio or video has failed). Therefore, the limit quantity of times for the voice packet and/or the video packet may be set to be less than the limit quantity of times for at least one other packet type, to avoid a waste of resources.

With reference to the first aspect or any implementation of the first aspect, in an implementation of the first aspect, in addition to reinstructing the WLAN chip to send the packet, the processor further indicates a retry limit for the packet type of the packet sent by the WLAN chip such that the WLAN chip sends the packet based on the retry limit for the packet type of the packet.

With reference to the first aspect or any implementation of the first aspect, in an implementation of the first aspect, the plurality of packet types include the voice packet and/or the video packet, and the plurality of packet types further include one or more of the UDP packet, the TCP packet, and the management frame.

A retry limit for the voice packet and/or the video packet is higher than a retry limit for at least one other packet type. The voice packet and/or the video packet has a relatively high real-time requirement. Therefore, a high retry limit is set for a packet with a high real-time requirement. This helps increase a possibility of delivering such a type of packet in a timely manner.

With reference to the first aspect or any implementation of the first aspect, in an implementation of the first aspect, the method further includes instructing, by the processor, the WLAN chip to configure a retry limit for a first access category and a retry limit for a second access category, where the retry limit for the first access category is higher than the retry limit for the second access category, the first access category is a voice access category or a video access category, and the second access category is a best effort access category or a background access category. The processor further indicates, based on the configurations of the retry limit for the first access category and the retry limit for the second access category, a target access category to which the packet type of the packet sent by the WLAN chip belongs such that the WLAN chip sends the packet based on a retry limit for the target access category, and the target access category is the first access category or the second access category.

A second aspect of this application provides a packet retransmission apparatus. The apparatus is configured to implement functions of the method provided in the first aspect or any optional implementation of the first aspect, and is implemented by software. The software includes modules corresponding to the functions, and each module is configured to perform a corresponding function.

A third aspect of this application provides a communications device. The communications device includes a processor and a WLAN chip.

The processor is configured to perform the packet retransmission method according to the first aspect or any implementation of the first aspect of this application.

A fourth aspect of this application provides a computer readable storage medium. The computer readable storage medium stores an instruction. When the instruction is run on a computer, the computer is enabled to perform the packet retransmission method according to the first aspect or any implementation of the first aspect of this application.

A fifth aspect of this application provides a computer program product including an instruction. When the computer program product is run on a computer, the computer is enabled to perform the packet retransmission method according to the first aspect or any implementation of the first aspect of this application.

DESCRIPTION OF EMBODIMENTS

In the specification, claims, and accompanying drawings of this application, the terms "first", "second", and the like are intended to distinguish between similar objects but do not necessarily describe a specific order or sequence.

Figure 1:
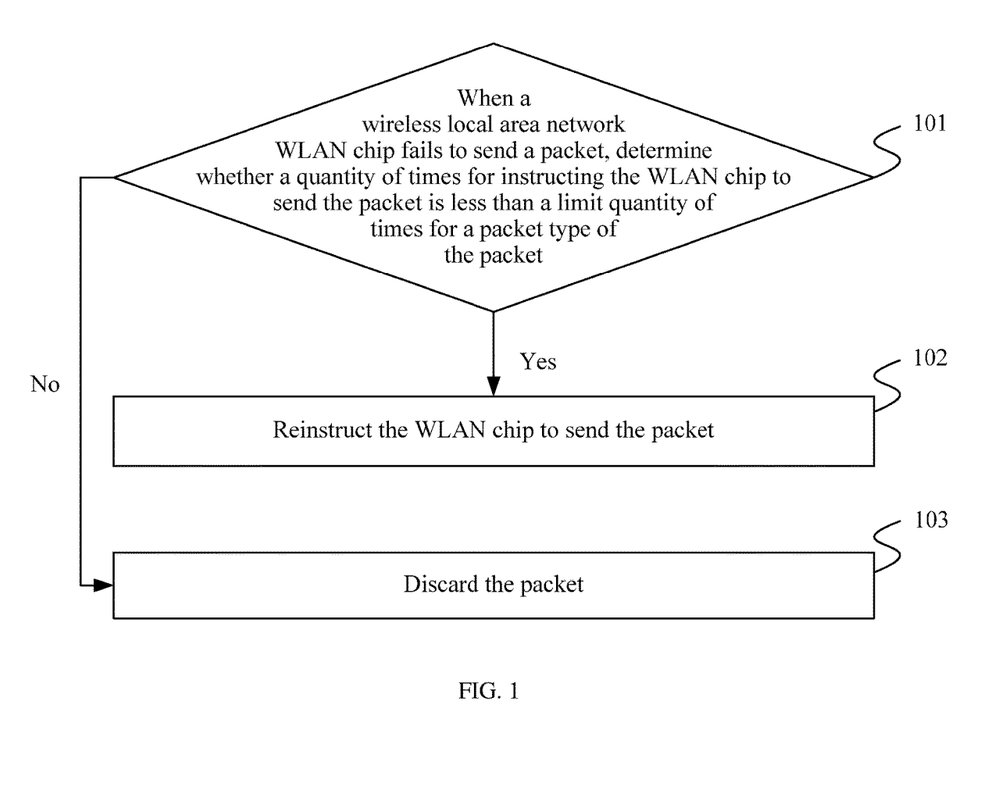
FIG. 1 is a schematic flowchart of a packet retransmission method according to this application.

This application provides a packet retransmission method, and a schematic flowchart of the packet retransmission method is shown in FIG. 1.

101. When a wireless local area network WLAN chip fails to send a packet, a processor determines whether a quantity of times for instructing the WLAN chip to send the packet is less than a limit quantity of times for a packet type of the packet. If the quantity of times for instructing, by the processor, the WLAN chip to send the packet is less than the limit quantity of times for the packet type of the packet, step 102 is performed. If the quantity of times for instructing, by the processor, the WLAN chip to send the packet reaches the limit quantity of times for the packet type of the packet, step 103 is performed.

If the WLAN chip does not receive an ACK, the WLAN chip may retransmit (that is, re-send) the packet. A failure of sending the packet by the WLAN chip means that the WLAN chip stops trying to retransmit the packet after a quantity of times or a time for trying to retransmit the packet reaches a limit.

The packet type is one of a plurality of (at least two) packet types, and limit quantities of times for at least two of the plurality of packet types are different from each other.

The packet type of the packet may be determined based on a type field of the packet. The limit quantity of times for the packet type of the packet may be preset by the processor based on the packet type, or may be configured by the processor based on the packet type of the packet in real time.

Optionally, the plurality of packet types include a voice packet and/or a video packet. The plurality of packet types further include one or more of a UDP packet, a TCP packet, and a management frame.

A limit quantity of times for the voice packet and/or the video packet is less than a limit quantity of times for at least one other packet type. If the voice packet and/or the video packet cannot be delivered in a timely manner, even though the voice packet and/or the video packet is finally sent successfully after being delayed for a relatively long time, a receive end may no longer need the voice packet and/or the video packet (because playing of a corresponding audio or video has failed). Therefore, for a packet with a high real-time requirement (for example, the voice packet and/or the video packet), the limit quantity of times for the voice packet and/or the video packet may be set to be less than the limit quantity of times for at least one other packet type, to avoid a waste of resources. A manner of setting the limit quantity of times for the voice packet and/or the video packet may be preset by the processor, or may be configured by the processor based on a packet type of the voice packet and/or the video packet in real time.

102. The processor reinstructs the WLAN chip to send the packet.

In step 101, when the processor determines that the quantity of times for instructing the WLAN chip to send the packet is less than the limit quantity of times for the packet type of the packet, the processor reinstructs the WLAN chip to send the packet.

The processor may immediately reinstruct the WLAN chip to send the packet. Alternatively, the processor reinstructs, after wait duration, the WLAN chip to send the packet. This implementation is intended for extending a time interval for reinstructing the WLAN chip to send the packet such that persistent burst noise that may occur is handled. For example, communication is good in $1^{st}$ to $2^{nd}$ seconds, whereas noise bursts in the $2^{nd}$ to $2.5^{th}$ seconds and then disappears. After the WLAN chip fails to send the packet in a $2.3^{rd}$ second, if the processor immediately instructs the WLAN chip to send the packet, sending of the packet may still fail. However, if the processor instructs, after waiting 0.2 second, the WLAN chip to send the packet, a probability that the packet can be sent successfully is increased. The wait duration may be a fixed value, may be dynamically adjusted, or may be a random value.

Optionally, in addition to reinstructing the WLAN chip to send the packet, the processor further indicates a retry limit for the packet type of the packet sent by the WLAN chip such that the WLAN chip sends the packet based on the retry limit for the packet type of the packet. Some WLAN chips can support setting of a retry limit for each packet. Therefore, the processor may set different retry limits for packets of different packet types, and indicate a retry limit for each separate packet to the WLAN chip. The WLAN chip receives, from the processor, the retry limit for the packet, and sends the packet based on the retry limit for the packet.

For the packet with the high real-time requirement, for example, the voice packet and/or the video packet, a retry limit for instructing, by the processor, the WLAN chip to send the voice packet and/or the video packet is higher than a retry limit for at least one other packet type. A high retry limit is set for the packet with the high real-time requirement. This helps increase a possibility of delivering such a type of packet in a timely manner.

Optionally, the processor instructs the WLAN chip to configure a retry limit for a first access category and a retry limit for a second access category. The retry limit for the first access category is higher than the retry limit for the second access category, the first access category is a voice access category or a video access category, and the second access category is a best effort access category or a background access category. The processor further indicates, based on the configurations of the retry limit for the first access category and the retry limit for the second access category, a target access category to which the packet type of the packet sent by the WLAN chip belongs such that the WLAN chip sends the packet based on a retry limit for the target access category, and the target access category is the first access category or the second access category.

For the packet with the high real-time requirement, for example, the voice packet and/or the video packet, a target access category that the voice packet and/or the video packet sent by the WLAN chip based on an instruction of the processor belongs to is the first access category such that the WLAN chip sends the voice packet and/or the video packet based on the retry limit for the first access category. For a UDP packet, a target access category that the UDP packet sent by the WLAN chip based on an instruction of the processor belongs to is the second access category such that the WLAN chip sends the UDP packet based on the retry limit for the second access category.

103. The processor discards the packet.

In step 101, when the processor determines that the quantity of times for instructing the WLAN chip to send the packet reaches the limit quantity of times for the packet type of the packet, the processor discards the packet.

In the technical solution of this application, when the WLAN chip fails to send the packet, if the quantity of times for instructing, by the processor, the WLAN chip to send the packet is less than the limit quantity of times for the packet type of the packet, the processor reinstructs the WLAN chip to send the packet. The processor reinstructs the WLAN chip to send the packet. Therefore, a quantity of times for sending the packet is increased, and a packet transmission success rate is increased.

Figure 2:
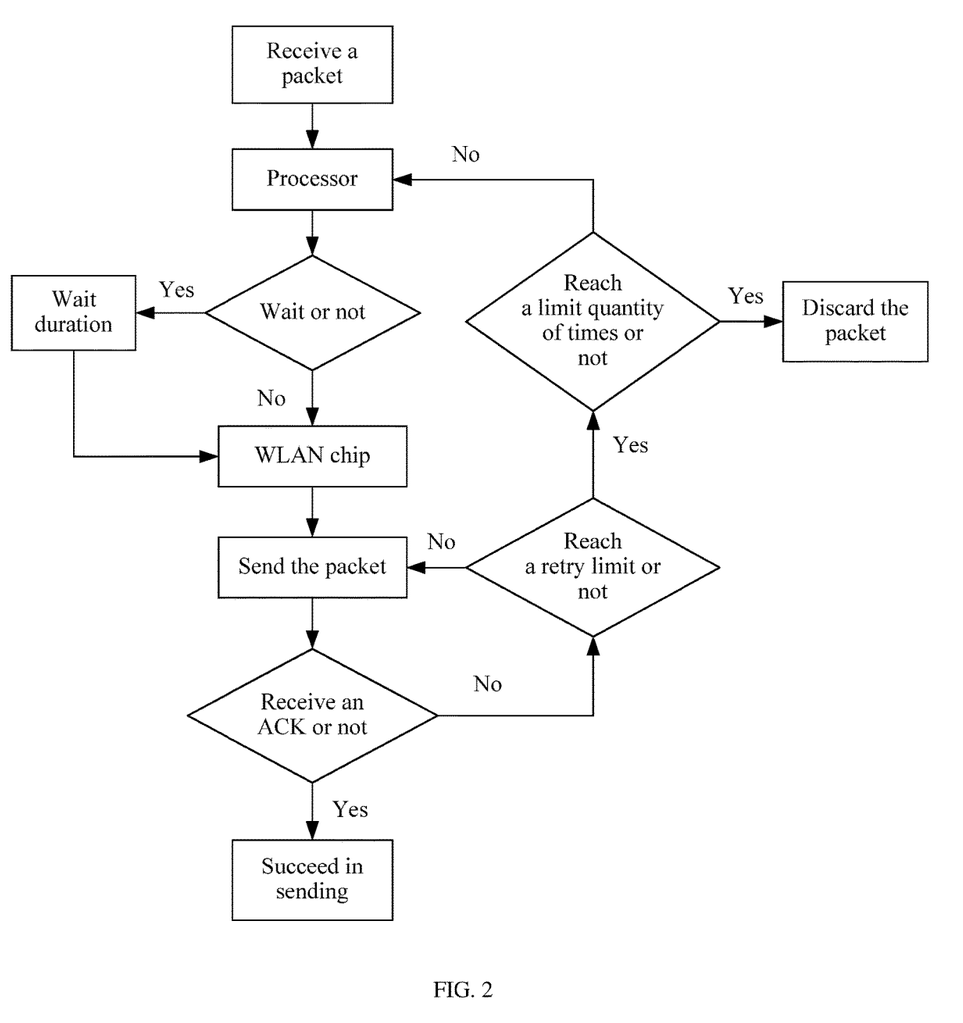
FIG. 2 is a schematic flowchart of a packet sending process according to this application.

Based on the packet retransmission method provided in this application, for a packet sending process, refer to a schematic flowchart shown in FIG. 2. In FIG. 2, after a packet is received and the packet is delivered to a processor, the processor instructs a WLAN chip to send the packet. If the WLAN chip receives, after the sending of the packet, an ACK returned by a peer end, it indicates that the packet is sent successfully, and the WLAN chip no longer needs to send the packet. If the WLAN chip does not receive, after the sending of the packet, the ACK returned by the peer end, the WLAN chip retransmits the packet, until the packet is sent successfully or a retry limit for the packet is reached. If the WLAN chip still does not receive, after the retry limit for the packet is reached, the ACK returned by the peer end, the WLAN chip returns, to the processor, a message indicating a failure of sending the packet. In this case, the processor determines whether a quantity of times for instructing the WLAN chip to send the packet is less than a limit quantity of times for a packet type of the packet. If the quantity of times for instructing the WLAN chip to send the packet is less than the limit quantity of times for the packet type of the packet, the processor reinstructs the WLAN chip to send the packet. If the quantity of times for instructing the WLAN chip to send the packet reaches the limit quantity of times for the packet type of the packet, the processor discards the packet. Certainly, based on the quantity of times for instructing, by the processor, the WLAN chip to send the packet (for example, the quantity of times is three, and the packet is still not sent successfully), the processor may consider reinstructing, after wait duration, the WLAN chip to send the packet.

Figure 3:
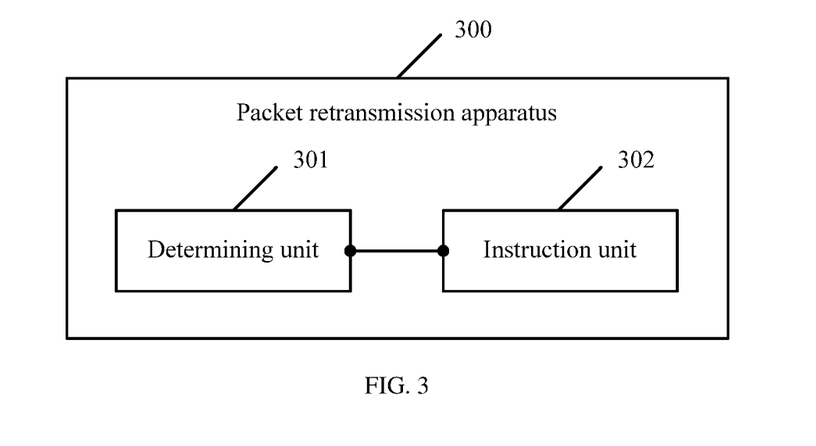
FIG. 3 is a schematic structural diagram of a packet retransmission apparatus according to this application.

This application further provides a packet retransmission apparatus 300. As shown in FIG. 3, the packet retransmission apparatus 300 includes a determining unit 301 configured to, when a WLAN chip fails to send a packet, determine whether a quantity of times for instructing the WLAN chip to send the packet is less than a limit quantity of times for a packet type of the packet; and an instruction unit 302 configured to when the determining unit 301 determines that the quantity of times for instructing the WLAN chip to send the packet is less than the limit quantity of times for the packet type of the packet, reinstruct the WLAN chip to send the packet, where the packet type is one of a plurality of packet types, and limit quantities of times for at least two of the plurality of packet types are different from each other.

In the technical solution of this application, when the WLAN chip fails to send the packet, if the determining unit 301 determines that the quantity of times for instructing the WLAN chip to send the packet is less than the limit quantity of times for the packet type of the packet, the instruction unit 302 reinstructs the WLAN chip to send the packet. The instruction unit 302 reinstructs the WLAN chip to send the packet. Therefore, a quantity of times for sending the packet is increased, and a packet transmission success rate is increased.

Optionally, the instruction unit 302 is further configured to discard the packet when the determining unit 301 determines that the quantity of times for instructing the WLAN chip to send the packet reaches the limit quantity of times for the packet type.

Optionally, that the instruction unit 302 is configured to reinstruct the WLAN chip to send the packet includes the instruction unit 302 is configured to reinstruct, after wait duration, the WLAN chip to send the packet.

Optionally, the plurality of packet types include a voice packet and/or a video packet, and the plurality of packet types further include one or more of a user datagram protocol UDP packet, a transmission control protocol TCP packet, and a management frame.

A limit quantity of times for the voice packet and/or the video packet is less than a limit quantity of times for at least one other packet type.

Optionally, the instruction unit 302 is further configured to indicate a retry limit for the packet type of the packet sent by the WLAN chip such that the WLAN chip sends the packet based on the retry limit for the packet type of the packet.

Optionally, the plurality of packet types include the voice packet and/or the video packet, and the plurality of packet types further include one or more of the UDP packet, the TCP packet, and the management frame.

A retry limit for the voice packet and/or the video packet is higher than a retry limit for at least one other packet type.

Optionally, the instruction unit 302 is further configured to instruct the WLAN chip to configure a retry limit for a first access category and a retry limit for a second access category. The retry limit for the first access category is higher than the retry limit for the second access category. The first access category is a voice access category or a video access category, and the second access category is a best effort access category or a background access category.

Figure 4:
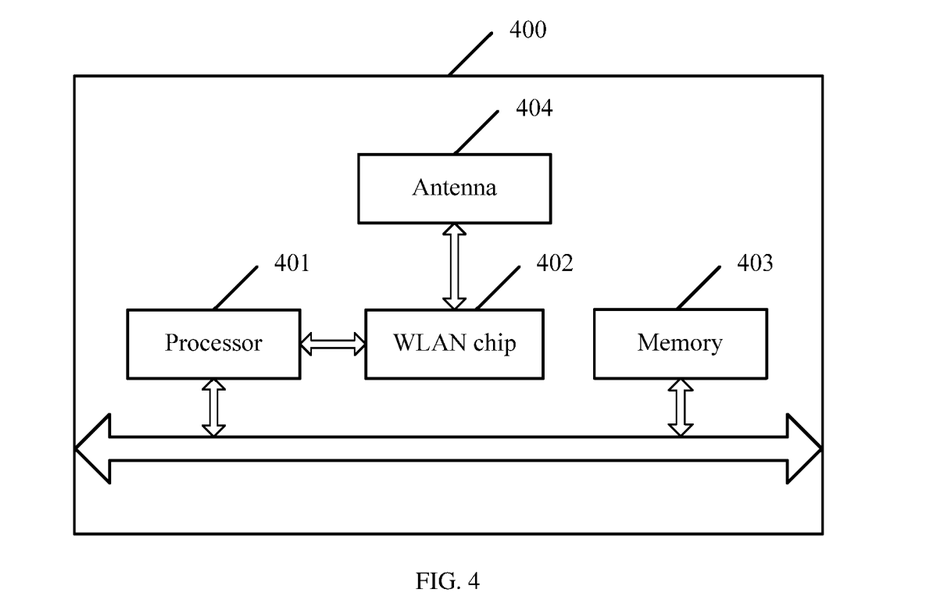
FIG. 4 is a schematic structural diagram of a communications device according to this application.

This application further provides a communications device 400. The communications device 400 may be an AP, or a non-AP station. As shown in FIG. 4, the communications device 400 includes a processor 401 and a WLAN chip 402. The processor 401 is configured to perform steps 101 to 103 in the packet retransmission method shown in FIG. 1 and some or all content in optional solutions of steps 101 to 103. For related descriptions, refer to related descriptions and effects in the method embodiment for understanding. Details are not described again herein.

The communications device 400 may further include a memory 403 and an antenna 404. The memory 403 is configured to store a program and an instruction. The antenna 404 is configured to receive or send information under control of the processor 401. The memory 403 is connected to the processor 401, and the connection may be implemented by using a bus. After the antenna 404 receives a packet, the processor 401 processes the packet, and instructs the WLAN chip 402 to send the packet.

Figure 5:
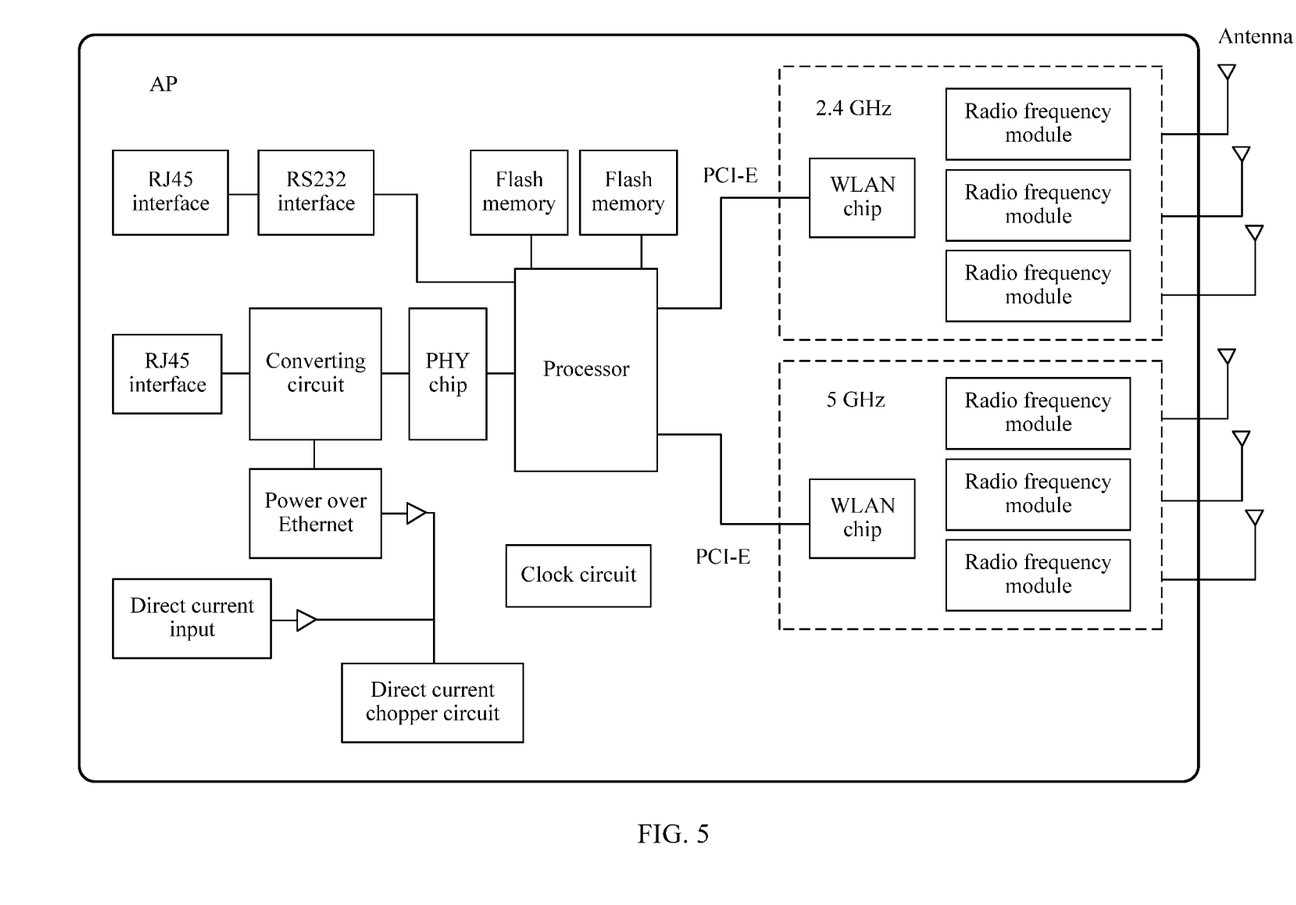
FIG. 5 is a schematic structural diagram of an AP according to this application.

In FIG. 5, a hardware structure of an AP is enumerated. A corresponding function of the processor 401 shown in FIG. 4 may be implemented by a processor shown in FIG. 5. A corresponding function of the WLAN chip 402 shown in FIG. 4 may be implemented by a WLAN chip shown in FIG. 5. A corresponding function of the memory 403 shown in FIG. 4 may be implemented by a memory or a flash memory shown in FIG. 5. A corresponding function of the antenna 404 shown in FIG. 4 may be implemented by an antenna shown in FIG. 5.

The AP enumerated in FIG. 5 may further include a power over Ethernet (POE) circuit, a direct current input circuit, and a direct current chopper circuit, to form a power supply system, so as to provide a power supply function. The AP may further include communications interfaces that include an RJ45 interface and an RS232 interface. The RJ45 interface is an Ethernet interface of the AP, and the RS232 interface is a standard universal serial interface. A packet is input from the Ethernet interface (the RJ45 interface in FIG. 5) of the AP, is converted by a converting circuit at a bottom layer and a gigabit Ethernet (GE) physical layer (PHY) chip, or is converted by the RS232 serial port, and arrives at the processor. The processor performs processing, to instruct the WLAN chip to send the packet. The AP enumerated in FIG. 5 further includes a radio frequency module. The radio frequency module in a dashed-line box and the WLAN chip a radio frequency circuit part of the AP. The packet may be modulated by the radio frequency module, and then sent by the antenna. The WLAN chip shown in FIG. 5 includes a chip supporting a frequency band of 2.4 GHz and a chip supporting a frequency band of 5G. The radio frequency module forms a peripheral circuit, and may include a power amplifier (PA), a low noise amplifier (LNA), and a transceiver switch. After a filter filters out a valid signal of the packet, the valid signal is amplified by each amplifier in the radio frequency module, and finally controlled by the transceiver switch for being sent by the antenna. The AP shown in FIG. 5 may further include a clock circuit. The clock circuit is configured to synchronize clock signals.

All or some of the foregoing embodiments may be implemented by using software, hardware, or a combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of the present disclosure are generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, a twisted pair, or an optical fiber) or wireless (for example, infrared, radio, or microwave) manner. The computer readable storage medium may be any medium that can be accessed by a computer, or a data storage device, such as a server or a data center, integrating one or more media. The medium may be a magnetic medium (for example, a floppy disk, a hard disk, or a magnetic tape), an optical medium (for example, an optical disc), a semiconductor medium (for example, a solid-state drive (SSD)), or the like.

Persons skilled in the art may clearly know that, for the purpose of convenient and brief description, in the foregoing embodiments, the embodiments emphasize different aspects, and for a part not described in detail in an embodiment, reference may be made to related descriptions of other embodiments.

For brevity of description, the foregoing method embodiments are expressed as a series of actions. However, persons skilled in the art should know that this application is not limited to the described action sequence, because according to this application, some steps may be performed in another sequence or performed simultaneously.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed.

The units described as separate parts may or may not be physically separate, and parts displayed as units may or may not be physical units, may be located on one position, or may be distributed on a plurality of network devices. Some or all of the devices may be selected based on actual requirements to achieve the objectives of the solutions of the embodiments.

In conclusion, the foregoing embodiments are merely intended for describing the technical solutions of the present disclosure, but not for limiting the present disclosure. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A packet retransmission method, comprising:
obtaining, by a processor, a quantity of times for instructing a wireless local area network (WLAN) chip to send a packet that is selected based on a type field of the packet during failure of the WLAN chip to send the packet, wherein the type field indicates a packet type of the packet from at least two packet types, and wherein the packet type comprises a protocol type of the packet that is selected from at least two different protocols; and reinstructing, by the processor, the WLAN chip to send the packet after a wait duration when the quantity of times is less than a first limit quantity of times of a first type field for a first packet type of the packet, wherein the wait duration is a dynamically adjusted value that is based on burst noise that is detected during packet transmission of the packet, wherein one of a plurality of packet types comprises the first packet type, and wherein each limit quantity of times for at least two of the packet types is different from each other.

2. The method of claim 1, further comprising discarding, by the processor, the packet when the quantity of times reaches the first limit quantity of times for the first packet type.

3. The method of claim 1, wherein the packet types comprise a voice packet or a video packet, wherein the packet types further comprise at least one of a User Datagram Protocol (UDP) packet, a Transmission Control Protocol (TCP) packet, or a management frame, and wherein a second limit quantity of times for the voice packet or the video packet is less than a third limit quantity of times for at least one other packet type.

4. The method of claim 1, further comprising:
 indicating, by the processor, a retry limit for the first packet type; and
 sending, by the WLAN chip, the packet based on the retry limit for the first packet type.

5. The method of claim 4, wherein the packet types comprise a voice packet or a video packet, wherein the packet types further comprise at least one of a user datagram protocol (UDP) packet, a transmission control protocol (TCP) packet, or a management frame, and wherein a second retry limit for the voice packet or the video packet is higher than a third retry limit for at least one other packet type.

6. A communications device, comprising:
 a wireless local area network (WLAN) chip; and
 a processor coupled to the WLAN chip and configured to:
  obtain a quantity of times for instructing the WLAN chip to send a packet that is selected based on a type field of the packet during failure of the WLAN chip to send the packet, wherein the type field indicates a packet type of the packet from at least two packet types, and wherein the packet type comprises a protocol type of the packet that is selected from at least two different protocols; and
  reinstruct the WLAN chip to send the packet after a wait duration when the quantity of times is less than a first limit quantity of times of a first type field for a first packet type of the packet, wherein the wait duration is a dynamically adjusted value that is based on burst noise that is detected during packet transmission of the packet, wherein the one of a plurality of packet types comprises the first packet type, and wherein each limit quantity of times for at least two of the packet types is different from each other.

7. The communications device of claim 6, wherein the processor is further configured to discard the packet when the quantity of times reaches the limit quantity of times for the first packet type.

8. The communications device of claim 6, wherein the packet types comprise a voice packet or a video packet, wherein the packet types further comprise at least one of a User Datagram Protocol (UDP) packet, a Transmission Control Protocol (TCP) packet, or a management frame, and wherein a second limit quantity of times for the voice packet or the video packet is less than a third limit quantity of times for at least one other packet type.

9. The communications device of claim 6, wherein the processor is further configured to instruct the WLAN chip to configure a first retry limit for the first packet type, and wherein the first packet type comprises a voice packet or a video packet.

10. The communications device of claim 6, wherein the processor is further configured to indicate a retry limit for the first packet type received from the WLAN chip, and wherein the WLAN chip is configured to send the packet based on the retry limit for the first packet type.

11. The communications device of claim 10, wherein the packet types comprise a voice packet or a video packet, wherein the packet types further comprise at least one of a user datagram protocol (UDP) packet, a transmission control protocol (TCP) packet, or a management frame, and wherein a second retry limit for the voice packet or the video packet is higher than a third retry limit for at least one other packet type.

12. A computer program product for packet retransmission comprising instructions that are stored on a non-transitory computer-readable medium and that, when executed by a processor, cause an apparatus to be configured to:
 obtain a quantity of times for instructing a wireless local area network (WLAN) chip to send a packet that is selected based on a type field of the packet during failure of the WLAN chip to send the packet, wherein the type field indicates a packet type of the packet from at least two packet types, and wherein the packet type comprises a protocol type of the packet that is selected from at least two different protocols; and
 reinstruct the WLAN chip to send the packet after a wait duration when the quantity of times is less than a first limit quantity of times of a first type field for a first packet type of the packet, wherein the wait duration is a dynamically adjusted value that is based on burst noise that is detected during packet transmission of the packet, wherein the one of a plurality of packet types comprises the first packet type, and wherein each limit quantity of times for at least two of the packet types is different from each other.

13. The computer program product of claim 12, wherein the instructions further cause the apparatus to discard the packet when the quantity of times reaches the limit quantity of times for the first packet type.

14. The computer program product of claim 12, wherein the packet types comprise a voice packet or a video packet, wherein the packet types further comprise at least one of a User Datagram Protocol (UDP) packet, a Transmission Control Protocol (TCP) packet, or a management frame, and wherein a second limit quantity of times for the voice packet or the video packet is less than a third limit quantity of times for at least one other packet type.

15. The computer program product of claim 12, wherein the instructions further cause the apparatus to instruct the WLAN chip to configure a first retry limit for the first packet type, and wherein the first packet type comprises a voice packet or a video packet.

16. The computer program product of claim 12, wherein the instructions further cause the apparatus to:
 indicate a retry limit for the first packet type received from the WLAN chip; and
 send the packet based on the retry limit for the first packet type.

17. The computer program product of claim 16, wherein the packet types comprise a voice packet or a video packet, wherein the packet types further comprise at least one of a User Datagram Protocol (UDP) packet, a Transmission Control Protocol (TCP) packet, or a management frame, and wherein a second retry limit for the voice packet or the video packet is higher than a third retry limit for at least one other packet type.

18. The method of claim 1, further comprising determining, by the processor, the first limit quantity of times for the first packet type based on a preset value or based on the packet type in real-time.

19. The communications device of claim 6, wherein the processor is further configured to determine the first limit quantity of times for the first packet type based on a preset value or based on the packet type in real-time.

20. The computer program product of claim 12, wherein the instructions further cause the apparatus to determine the first limit quantity of times for the first packet type based on a preset value or based on the packet type in real-time.

* * * * *